Jan. 28, 1964  H. A. SEARS  3,119,978
DEVICE FOR CONNECTING CABLES TO GEOPHONES
Filed Feb. 14, 1962
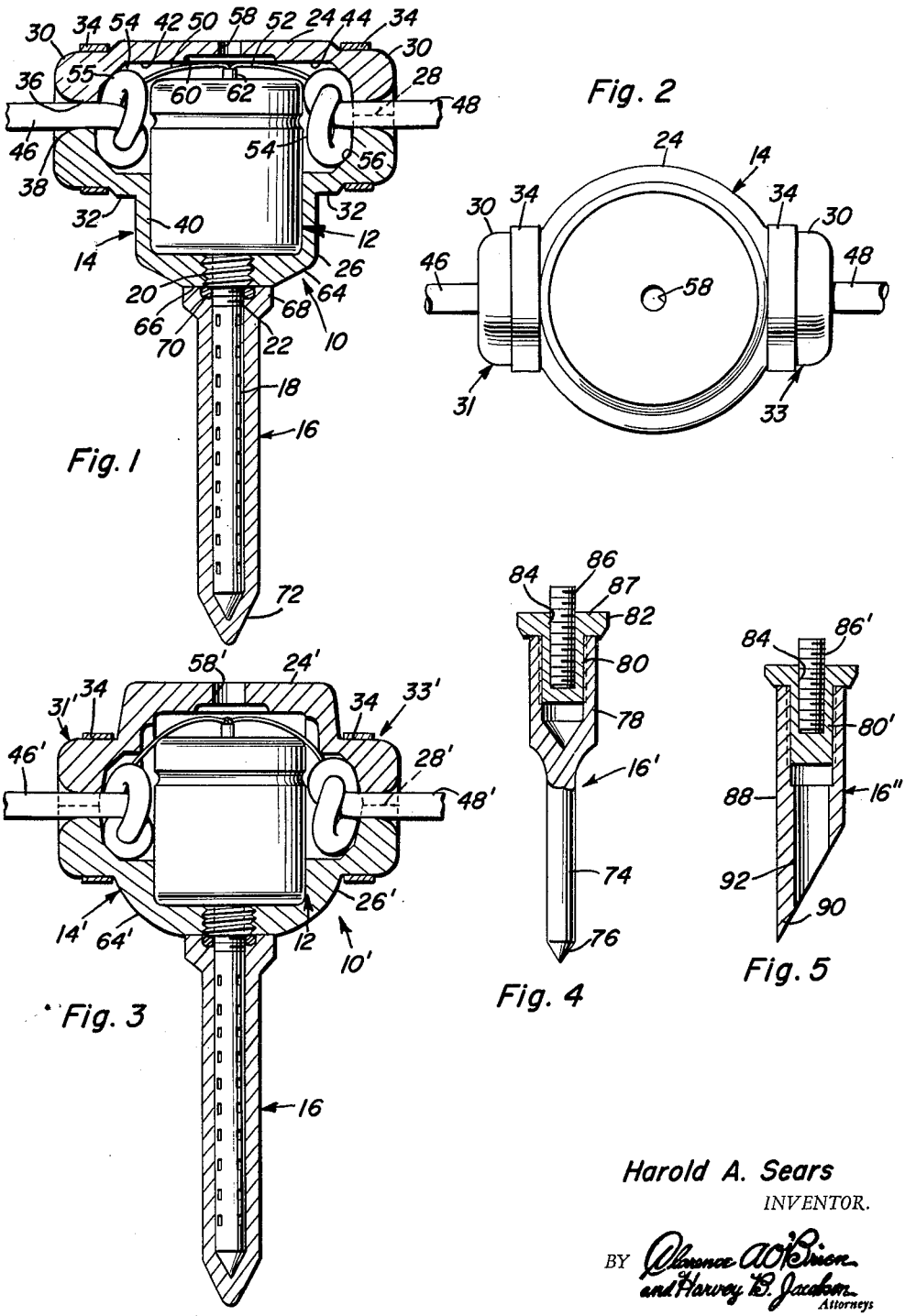
Harold A. Sears
INVENTOR.
BY *Clarence A. O'Brien*
*and Harvey B. Jacobson*
Attorneys

United States Patent Office 3,119,978
Patented Jan. 28, 1964

3,119,978
DEVICE FOR CONNECTING CABLES TO GEOPHONES
Harold A. Sears, Houston, Tex., assignor to Hall-Sears, Inc., Houston, Tex., a corporation of Texas
Filed Feb. 14, 1962, Ser. No. 173,221
3 Claims. (Cl. 340—17)

This invention relates to improved electrical devices and more particularly to an improved geophone for a seismic detector and a method for improving geophones for seismic detectors.

Accordingly, it is the primary object of the invention to provide an improved geophone for seismic detectors and to disclose a novel method for improving geophones.

More specifically, a primary object of the invention is to provide an improved method and apparatus for securing cables to the cases of geophones of seismic detectors.

It is another object of the invention to provide method and apparatus for waterproofing and sealing geophones of seismic detectors and for improving the qualities of the electrical cables connected thereto.

This invention provides a device for housing a seismic detector in such a way that the electrical cable attached to the detector terminals may be secured by a knot anchor, the detector is completely insulated from the ground, and the detector is compleely waterproofed by injection of a suitable potting compound into the housing or case of the detector so that all voids are completely filled.

When the seismic detector has been installed in the case which is the subject of this invention, it may be employed in virtually any form of seismic prospecting with a maximum trouble free life expectancy. Knot-anchoring causes full strength of the cables to be available without transmission of strain to the detector terminals or electrical conductors attached thereto. The curved surfaces of the case projection through which the electrical cables extend minimize the likelihood of cable breaks that would be caused by flexing of the cables at a corner of the case. Insulation of the detector from the ground prevents leakage and minimizes the pick up of external electrical currents. Complete waterproofing of the detector is afforded by the potting compound within the case which permits the detector to be used under unfavorable field conditions. The improved case, the insulated bottom fitting attached to the case, and the potting compound sealing the case protect the detector within the case against corrosion, rust, and impact damage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical cross sectional view taken through the center of a geophone comprising the invention;
FIGURE 2 is a plan view of the invention;
FIGURE 3 is a cross sectional vertical view similar to FIGURE 1 but showing a slightly modified form of the invention;
FIGURE 4 is a vertical cross sectional view through a modified form of bottom fitting for the geophones shown in FIGURES 1 and 3; and
FIGURE 5 is another modification of a bottom fitting suitable for use with the geophones shown in FIGURES 4 and 3.

With continuing reference to the drawings wherein identical reference numerals in the various figures indicate the same parts, it can be seen that the geophone 10 includes a seismic detector 12 enclosed in an insulating housing 14 preferably composed of high impact plastic. The housing 14 also includes a generally tubular extension 16 composed of the same material as the housing and enclosing a sensitive vibration pick up device 18 operatively connected to the seismic detector 12. The pick up 18 and detector 12 are conventional in design and construction and the improvements in this invention are confined to the housing and for housing these elements and the cables connected thereto.

The detector 12 is of generally cylindrical shape and is concentric with the tubular extension 20 which is internally and externally threaded. The upper end of the pick up device 18 is provided with threads 22 which mate with the internal threads of extension 20, thereby rigidly connecting the extension to the connector.

The housing 14 is composed of upper cap 24 and a base 26. The cap and base have coplanar bottom and top surfaces abutting one another at 28. As shown in FIGURE 2, housing 14 is of generally cylindrical shape so as to be concentric with the cylindrical detector 12. The cap and base each have a pair of aligned semi-cylindrical projections 30 and 32 respectively which abut one another along plane 28 to form cylindrical or tubular extensions on opposite sides of housing 14. These tubular extensions are snugly surrounded by tubular metal bands 34 which secure cap 24 and base 26 together. Alternatively, the cap and base may be glued together.

The tubular extensions on diametrically opposite sides of the housing each have aligned coaxial bores therethrough as shown at 36. Each bore has a chamfered outer end 38 which has a quarter spherical center.

Base 26 of housing 14 has a cylindrical bore 40 for receiving the bottom half of the detector 12. The cap 24 is provided with a similar bore aligned with the bore 40 for receiving the upper end of the detector. The tubular extensions 31 and 33 formed by the semi-tubular or semi-cylindrical extensions 30 and 32 have cylindrical bores 42 and 44 radiating from the upper end of the bore 40 and concentric with the bores 36.

Conductors 50 and 52 are preferably composed of a low resistance electrical wire enclosed in flexible insulation 46 and 48 extending through the bores 36 and the tubular end of the tubular extensions 31 and 33. The end of the conductors and their insulation are formed into a conventional knot 54 which abuts the outer ends of the bores 42 and 44. The end walls 55 and 56 are preferably shaped substantially the same as knots 54.

The center of the cap 24 is provided with a bore or aperture 58 enlarged at its inner end as shown at 60. The terminals 62 of the detector 12 are directly below the bore 58 and that portion of the conductors 50 and 52 extending between the terminals 62 and knot 54 have no insulation thereon. The bottom of the housing has a frusto-conical shaped portion 64 terminating in a flat circular bottom 66.

The tubular extension 16 has a circular head 68 having an annular recess formed in its upper end which receives an annular sealing gasket 70. The gasket 70 abuts the surface 66 and forms a seal between extension 16 and face 26. The bottom of the extension 16 is provided with a conical point 72.

When assembling the geophone 10, detector 12 is inserted into bore 40 and the threaded extension 22 of the extension 16 is threaded into the threaded extension 20 of the detector 12 so as to secure the extension 16 to the base of housing 14. The gasket 70 forms a seal between the extension 16 and base 26. The conductors 50 and 52 then have knots 54 formed on the outer ends which are inserted into the lower half of each bore 44 formed in the base 26. Insulation is stripped from the extreme ends of the conductors and these ends are then connected at 62 to the detector 12. The cap 24 is then placed on the base 26 and secured thereto by means of the tubular band 34. Then potting material is inserted through the bore 58 so as to completely fill all of the voids within the housing 14 that occurs between the detector 12, the conductors 50 and 52 and the interior surfaces of the housing. This completely waterproofs the geophone 10 and seals all parts thereof from moisture. The knots 54 react against the surfaces 55 and 56 to prevent any tension from being placed on the connection between the wires and the terminal 62. The semi-spherical surfaces 38 permit the wires to flex relative to the housing 14 without damaging or cutting the insulation 46 and 48.

The geophone 10' shown in FIGURE 3 is substantially of the same design as the geophone 10 shown in FIGURE 1 except for a slightly modified shape of the housing 14'. The housing 14' comprises a base 26' and a cap 24' of substantially the same size and joined along planar flat surfaces 28 of the base and cap. Since the base and cap are substantially of the same size, the tubular projections 33' and 31' are located at substantially the vertical center of the housing. The bottom of the base 26 is substantially semi-spherical as shown at 64' rather than being frusto-conical as is the housing 14 as is the base 26 in FIGURE 1.

Extensions 16' and 16" shown in FIGURES 4 and 5 can be substituted for extension 16 as shown in FIGURES 1 and 3. The extension 16' comprises a metal rod 74 having a pointed conical lower end 76 for penetrating the ground and an enlarged tubular upper end 78. The inside bore of the tubular end 78 is threaded and receives the threads formed on the outer surface of a cylindrical connecter 80 having an annular flange 82 formed at its upper end and a threaded central bore 84 which receives a threaded stud 86. The connector 80 is preferably formed of some insulating material such as plastic and its upper surface 87 may be sealed to the surface 66 of the geophone when the upper end of stud 86 is threaded into extension 20 by bonding the conductor to the housing of the geophone by means of a plastic solvent or cement. The connector 80 insulates the geophone from the extension 16'.

The extension 16" is formed of a tubular metallic member 88 having a tapered end 90 for penetration of the ground and a bore 92 therethrough. A connector 80' identical to the connector 80 shown in FIGURE 4 may be threaded into the upper end of tube 88. A stud 86' is threaded into the bore 84 within the connector 80', whereby the connector 16' may be connected to the geophone in the same manner as the other connector disclosed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a geophone having a seismic detector, a housing enclosing said detector and having a pair of axially aligned bores formed on opposite side portions, said housing being formed by two sections having abutting surfaces extending through said bores, one of said housing sections having an elongated extension projecting from a chamber within which the detector is seated, the other of said housing sections closing said chamber and being formed with an access opening axially aligned with said elongated extension, said side portions of the housing forming spaces on opposite sides of the detector in communication with said access opening, a pair of flexible electrical conduits extending into the housing through said bores having knotted portions disposed in the spaces formed by said side portions, a lead connection mounted on the detector and disposed within the other housing section for exposure from said one housing section prior to assembly of the other housing section thereon, lead portions of said electrical conduits being bared beyond the knotted portions and connected to the lead connection on the detector, and potting material completely filling said spaces and the other section of the housing in surrounding relation to the knotted and lead portions of the electrical cables, the lead connection and the detector, said potting material being inserted into the enclosed chamber and the spaces through said access opening after the other section is assembled, and band means enclosing said side portions of the housing for holding the housing sections assembled.

2. A device as defined in claim 1 wherein said bores are bisected by the abutting surfaces of said housing sections.

3. A device as defined in claim 2 wherein said housing includes a cylindrical chamber portion and said bores are formed in the side portions which project radially from the cylindrical chamber portions.

References Cited in the file of this patent

UNITED STATES PATENTS

| | | |
|---|---|---|
| 1,425,694 | Recker | Aug. 15, 1922 |
| 1,593,084 | Kline | July 20, 1926 |
| 2,712,124 | Ording | June 28, 1955 |
| 2,745,085 | McCarty et al. | May 8, 1956 |
| 2,908,890 | Campbell et al. | Oct. 13, 1959 |